US008190508B1

(12) United States Patent
Sack

(10) Patent No.: US 8,190,508 B1
(45) Date of Patent: May 29, 2012

(54) BID MANAGEMENT OPTIMIZATION

(75) Inventor: Michael Sack, Natick, MA (US)

(73) Assignee: SuperMedia LLC, DFW Airport, TX (US)

( * ) Notice: Subject to any disclaimer, the term of this patent is extended or adjusted under 35 U.S.C. 154(b) by 0 days.

(21) Appl. No.: 12/846,037

(22) Filed: Jul. 29, 2010

Related U.S. Application Data

(63) Continuation of application No. 10/883,556, filed on Jul. 1, 2004, now Pat. No. 7,788,159.

(51) Int. Cl.
G06Q 40/00 (2006.01)
(52) U.S. Cl. .......................................... 705/37; 705/38
(58) Field of Classification Search ............... 705/35–39
See application file for complete search history.

(56) References Cited

U.S. PATENT DOCUMENTS

| 6,785,671 | B1 | 8/2004 | Bailey et al. |
| 7,092,901 | B2 | 8/2006 | Davis et al. |
| 2003/0088525 | A1* | 5/2003 | Velez et al. ................... 705/400 |
| 2003/0093285 | A1 | 5/2003 | Colace et al. |
| 2003/0191725 | A1 | 10/2003 | Ratliff et al. |
| 2003/0216930 | A1 | 11/2003 | Dunham et al. |
| 2004/0015397 | A1 | 1/2004 | Barry et al. |
| 2004/0199397 | A1 | 10/2004 | Dresden |
| 2005/0144068 | A1 | 6/2005 | Calabria et al. |
| 2005/0165615 | A1 | 7/2005 | Minar |
| 2005/0203796 | A1 | 9/2005 | Anand et al. |

OTHER PUBLICATIONS

BidRank, Roffers Engineering, Inc., Fond du Lac, WI, Pages from Feb. 7, 2004 archive of www.bidrank.com, obtained from archive.org on Jan. 6, 2005, 5 pages. http://web.archive.org/web/20040130063926/www.bidrank.com/.
bidsMonitor, Ashdown Technologies, Inc., Manchaug, MA, Pages from Feb. 24, 2004 archive of www.bidsmonitor.com obtained from archive.org on Jan. 6, 2005, 5 pages. http://web.archive.org/web/20040224191807/http://bidsmonitor.com/.
Apex Pacific, Apex Pacific Pty Ltd, Australia, Pages from Feb. 12, 2004 archive of www.submission2000.com, obtained from archive.org on Jan. 6, 2005, 8 pages. http://web.archive.org/web/20040212181217/http://www.submission2000.com/index.html.
Epic Sky, Epic Sky Inc., San Diego, CA, Pages from Feb. 12, 2004 archive of www.epicsky.com, obtained from archive.org on Jan. 6, 2005, 5 pages. http://web.archive.org/web/20040212124046/http://www.epicsky.com/index.html.
PPC Toolkit, Softnik Technologies, India, Pages from Dec. 30, 2003 archive of www.ppctoolkit.com, obtained from archive.org on Jan. 6, 2005, 13 pages. http://web.archive.org/web/20031230150840/http://ppctoolkit.com/.
GO TOAST, GO TOAST LLC, Centennial, CO, Pages from Feb. 8, 2004 archive of www.gotoast.com, obtained from archive.org on Jan. 6, 2005, 17 pages. http://web.archive.org/web/20040208062355/http://gotoast.com/.

(Continued)

Primary Examiner — Thu Thao Havan
(74) Attorney, Agent, or Firm — Rader, Fishman & Grauer PLLC

(57) ABSTRACT

A computing device receives, from a module that manages bids to bid engines, data relating to a bid rule, the data including at least two metrics concerning performance of the bid rule. Two of the metrics are selected for defining a goal for the bid rule, wherein a first one of the selected metrics is a primary metric and a second one of the metrics is a secondary metric, the primary metric being a value that is subject to an optimization, and the secondary metric being used to establish one or more constraints. The goal is defined by performing the optimization subject to the one or more constraints.

28 Claims, 9 Drawing Sheets

OTHER PUBLICATIONS

PPC Management, Pay-Per-Click Management, Inc., Poughkeepsie, NY, Pages. from Dec. 12, 2003, 2004 archive of www.ppcmanagement.com, obtained from archive.org on Jan. 7, 2005, 7 pages. http://web.archive.org/web/20031202112950/http://www.ppcmanagement.com/.

SureHits, Cyberspace Communications Corp., Edmond, OK, Pages from Jan. 31, 2004 archive of www.sure-hits.com, obtained from archive.org on Jan. 7, 2005, 2 pages. http://web.archive.org/web/20040131110045/http://www.sure-hits.com/.

* cited by examiner

| Tree | Console Activity |
|---|---|
| + Keyword 1<br>+ Keyword 2<br>+ Keyword 3<br>+ Keyword 4<br>- Keyword 5<br>    - Overture Rule<br>    - FindWhat Rule<br>    - Google Rule<br>+ Keyword 6<br>+ Keyword 7 | Full Ability To Sort On The Criteria In The Tree. Enables users to see which keywords are in Overture vs. Google, which ones have what rules applied plus more options. |

BID MANAGEMENT OPTIMIZATION

CROSS REFERENCE TO RELATED APPLICATIONS

This application is a continuation of, and claims priority to, co-pending application Ser. No. 10/883,556, filed Jul. 1, 2004.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright 2004-2010 SuperMedia LLC.

BACKGROUND

The Pay-For-Placement Search Engine

Starting in 2001 with Overture (formerly known as GoTo), a new type of search engine emerged where advertisers could "bid" for a specific ranking or position on keywords or phrases in a search engine. Contrary to algorithmic-based search engines which use complex formulas to evaluate an actual web page and determine its relevancy to a specific keyword or phrase, an advertiser could simply "buy" its way to the top of search results. This was designated as "Pay-for-Placement" (PFP) search.

After the creation of a network of distribution with search engines, PFP search became very effective. During 2002, the popularity of this model soared with increased spending on these programs by advertisers as well as an onslaught of additional PFP engines and ancillary support tools. As the popularity of PFP advertising increased, the demand for PFP tools increased.

Bid Management

Placement and ranking of advertisements in search results is determined by user bids on keywords. Bid Management is defined as the process by which bids for specific ranking positions at PFP search engines are automatically or manually managed with software. PFP search engines include 7Search (7search.com), AhHa (ah-ha.com), BrainFox (brainfox.com), ePilot (epilot.com), eSpotting (UK, DE, FR, IT, SP) (espotting.com), FindWhat (findwhat.com), GoClick (goclick.com), Google Adwords Select (google.com/ads), Kalloodle (kanoodle.com), Overture (US, UK, DE, FR) (overture.com), Search 123 (search123.com), Sprinks (sprinks com), Turbo10 (turbo10.com), and Xuppa (xuppa.com).

First-Party Bid Management

First-party Bid Management (BM) is provided directly by each independent PFPsearch engine. A basic user interface is provided for the following functionality: 1) Account Management (initial set-up, billing, contact), 2) Keyword Management (enter keyword, description, URL landing page), 3) Bidding Rule Management (see below), and 4) Basic Reporting (position, bid amount, click-throughs, account balance).

All of the above listed features are considered straightforward and standard BM features. The complex and special features relate to "Bidding Rules." Most, if not all, PFP search engines allow users to set some basic bidding rules such as specifying the maximum price-per-click and monitoring funds to cap all bids at a maximum amount. These rules tend to be fixed, subject to human monitoring and adjustment, but with some automated capabilities.

For example, one rule could be: for the phrase XYZ, set bid at $1.50, but cap clicks at $2,000. This rule basically says that for the phrase XYZ, I want to bid $1.50 per click (which could result in the number one ranking so long as no one out bids me) and when I've spent $2,000, remove my phrase (e.g. by setting the bid to $0).

Drawbacks to First-Party Bid Management

The major drawbacks of using the BM features at a particular PFP engine are:

1) No economies of scale. Including keywords in several PFP engines means setting up, managing, and maintaining an account at each PFP engine.
2) Lack of sophistication in bidding rules. The rules engines are simple and can only base bidding on criteria the PFP engine has control over, such as position, Cost-per-click (CPC), or click-throughs.
3) Separate reporting. Analyzing aggregate performance across PFP engines, requires extracting the relevant data and building a separate reporting mechanism.
4) No connection to site-side results. The PFP engines track click-throughs and page impressions for keywords and phrases, but do not track sales as a result of the placed advertisements. In other words, the PFP engine tracks activity on its portal, but not activity on a user's website.

Third-Party Bid Management Tools

Third-party bid management tools include BidRank (bidrank.com), Bids Monitor (bidsmonitor.com), Dynamic Keyword Bid Maximizer (submission2000.com/overturebid-maximizer.html), Epic Sky (epicsky.com), Good Keywords Pro, (ppctoolkit.com/products/gkwpro), Go Toast (gotoast.com), PPC Pro (ppcmanagement.com/ppc_pro.htm), and Sure Hits (sure-hits.com).

Third party BM technologies enhance the bid management process by enabling users to increase the sophistication of their bids by automating the rules, enabling users to intelligently bid, and automatically updating the bids at PFP engines. They also serve to aggregate multiple PFP engines through a single interface, making it easier for users to manage keywords across several PFP engines.

Features of third-party BM tools include 1) Account Management (set-up, billing, contact), 2) Centralized Keyword Management (keyword, description, URL), 3) Bidding Rule Configurator (by engine, increased functionality), and 4) Basic Reporting (Traffic by PFP engine, position, cost, account balance).

An example of a third-party bid rule is as follows: Phrase=123, target positions 1-3, between the hours of 4 PM-11 PM, with a maximum bid of $1.50 per click, incremented in $0.05 increments, target positions 4-10, between the hours of 11 AM-3:59 PM, with a maximum bid of $0.75 per bid, incremented in $0.05 increments, and from 11:01 PM-10:59 AM make no bid, check positions 12 times per day, cap bids at $2,000.

The third party bid management tool interprets this example rule to check and update this user's bids every other hour. During specified periods of the day, it will bid more aggressively than other times, allowing the user to maximize the impact of each advertising dollar. The third party bid management tool will automatically increment the bid to keep the keyword in the desired position, yet the cost will not go above the cap limit and the budget allocation.

Typical third party bid rules include:
1) timed rank—change position based on time of day;
2) first gap—moves a keyword to first gap;

3) largest gap—moves a keyword to largest gap;
4) time zone—moves listing to desired position by time zone;
5) delayed start—executes bidding after specified time;
6) price differential—moves position only if the price differential is greater than 'x';
7) relative listing—moves listing to a position above/below specified URL;
8) maximum bid gap—moves bid to 1 cent below competitor's listing;
9) last place—moves a listing to last place;
10) timed bid—changes a bid based on time of day;
11) budget manager—lowers keyword position based on pre-set daily budget.

Drawbacks of Third Party Bid Management

While third party BM tools allow advertisers to aggregate content and feed multiple PFP engines, few offer much in the way of increased sophistication of bidding rules, or performance-based bidding, and none are integrated with other traffic generation and tracking solutions. These third party BM tools focus on the portal-side optimization and not on the site-side. That is, optimization with third party BM tools only operates at the keyword level. Thus, even though an advertiser can compare performance across multiple PFP engines, the advertiser is only comparing the performance of keywords. The advertiser cannot compare performance against other online marketing programs without extracting data and manually integrating the results. The keyword focused optimization is a high-cost, high-risk model of BM. It is desirable to tie actual revenue, site assessment, and keyword research with paid placement of advertisements in search engines.

None of the prior art BM tools provides a site-side integrated, performance-based BM tool. What is needed therefore, is a performance-based BM tool that overcomes the above-mentioned limitations and that includes the features enumerated above.

BRIEF SUMMARY

The invention enables bid management with a robust set of rules that ties bids to actual site-side performance. From site-side performance data, the invention creates an optimal portfolio of keywords by 1) determining optimal mix of keywords, position, and bids to achieve greatest return for risk, 2) comparing keywords against one another to determine allocation of budget. and 3) automatically implementing recommendations.

Objects

The invention is designed to optimize keyword placement to maximize revenue. An object of the invention is to efficiently manage keywords at multiple PFP engines from a central interface. Another object of the invention is controlling non-performance bidding by position, bid. time of day, and other attributes. Another object of the invention is providing a tool to control performance bidding based on desired optimization goals such as maximizing traffic or revenue, staying within pre-determined ROI or cost-per-acquisition (CPA) ranges. Another object of the invention is providing clear and concise reporting, oriented towards exception management (i.e. focusing on under-performing terms) to ensure optimal performance.

Features

A feature of the present invention is a dedicated BM console. This dedicated BM console allows users to manage their BM "tree" in one location. Functions of the console include: importing or entering keywords; building and applying rules; targeting PFP engines; setting, managing and updating budgets; and reporting. The console also includes an organization tree adjustable to show associations by keyword, rule, or PFP engine.

Another feature is centralized account management. The present invention integrates with existing top level account management programs that govern users and usage privileges. This extends top level account management programs to add a role for BM and budgetary control. Users optionally add a BM layer to pre-existing account management programs, or to a centralized BM console.

Another feature is centralized keyword management. The BM program allows users to import Promotional Visibility (PV) campaigns as BM keywords as well as allowing users to create new keywords directly in the BM console. PV includes non-bid management programs such as natural search phrases and paid inclusion programs. Alternatively, users upload keywords in bulk through a comma separated value (CSV) file format, or other file format suitable for importing into a database. Keywords are organized into groups for the purpose of applying rules or settings to ranges of keywords. Keywords are managed independently or within the construct of a group.

Another feature is centralized-bidding rule management. This enables users to construct multi-level rules for both non-performance and performance-based bidding. Users are able to create rules and assign rules to one or more keywords, or one or more groupings of keywords. Rules are specific to particular search engines.

Non-performance based rule types include:
1) Position based—bid for a specific position.
2) Bid cap—auto increment bid to a specific CPC cap or range.
3) Time based—change position or bid based on time of day or time zone.
4) Gap manager—manage bid gaps by targeting or minimizing gaps.
5) Scheduler—set a schedule for bidding (maximum 1× per hour, 24× per day).
6) Target URL—Bid above or below a targeted URL.
7) Bid stop—criteria under which a bid is pulled or sent to a specific placement.
8) Budget control—manage bids based on a particular budget (daily, weekly or monthly).

Performance-based rule types include:
1) Click—Throughs—auto increment bid if click-throughs remain above desired target.
2) ROI bid—auto increment bid if ROI is above desired target.
3) Conversion Rate—auto increment bid if conversion rate is above desired target.
4) CPA bid—auto increment bid if cost-per-acquisition is below desired target.
5) Revenue bid—auto increment bid if revenue is above desired target.
6) Funds manager—automatically distribute funds to keyword rules that produce the best results allowing for maximum efficiency for money spent.

The invention provides for any combination of the two types of bid rules, with the exception of contradictory conditions that can arise between performance-based bidding and non-performance bidding.

Another feature is point-and-click access to multiple PFP engines. As users create rules for various keywords and activate them, the words and bidding rules are automatically implemented in the back-end of the present invention. A series of Application Program Interfaces (APIs) provide connections to the various PFP engines to enable back-end feeds of keywords to the PFP engines. Use of these APIs automates inclusion of a given keyword and its rule.

Periodically (for example, each hour), in anticipation of updating keyword bidding, the present invention reviews the database of keywords and rules, identifies which keywords are to be added or updated, analyzes the performance of the keywords (if necessary), and creates a parsed rule that is automatically fed to the specific PFP engine.

Another feature of the present invention is performance tracking Performance tracking adds to the ability to track a keyword at any PFP engine. This functionality is natively available for all keywords in BM. As keywords are fed to the PFP engines, a virtual URL, specific to the PFP engine, is used in the background for this tracking. This ensures the most accurate performance tracking of keywords. When a keyword is clicked at a given PFP engine, the request is received, logged, and the desired action is executed. The invention may also track revenue by keyword to calculate a ROI by keyword for bidding recommendations.

Another feature is multi-action redirecting. A complex action functionality is designed to allow users to control where a visitor lands on their site when a given virtual URL is clicked. This functionality enables users to execute static redirects, dynamic redirects, router redirects for testing, serve a file or resource, and serve 404 (file not found) 500 (internal server error) or other web server errors.

Another feature of the present invention is integrated reporting. A complete reporting functionality designed to report on the performance of Keywords is enhanced to add the following types of reports specific to a BM tab in the reporting interface. Position Reporting shows current position of keyword by PFP engine. Bid Reporting shows current bid price for the position by PFP engine. Bid cost/ROI Reporting shows cost/ROI of each keyword by PFP engine. This data is viewable within the BM console to make it easier for users to respond and make modifications to keywords and rules.

Another feature is the incorporation of existing bid management tools such as a term suggestion tool designed to help users identify and target keywords that are likely to drive traffic. These tools are available through the BM console.

Advantages

An advantage of the present invention is a better ROI. The present invention helps marketers and advertisers increase the performance of their dollars spent at PFP engines.

Another advantage of the present invention is easier management. The present invention makes it easier to manage PFP activity by integrating the work and management within their overall online marketing management handled within the BM console.

Another advantage of the present invention is accurate performance tracking Marketers are able to accurately track performance down to conversions, CPA, ROI, and revenue.

Another advantage of the present invention is cross-channel analysis. The BM solutions of the present invention make it easy for marketers to compare PFP performance against other programs such as paid inclusion, banners, email, and affiliate programs.

BRIEF DESCRIPTION OF THE DRAWINGS

In the drawings, closely related figures and items have the same number but different alphabetic suffixes. Processes, states, statuses, and databases are named for their respective functions.

FIG. 2 shows an organizational tree illustrating centralized keyword management.
FIG. 3C shows the GUI for the main console, rule tab.

DETAILED DESCRIPTION OF THE INVENTION, INCLUDING THE PREFERRED EMBODIMENT

Operation

In the following detailed description of the invention, reference is made to the accompanying drawings which form a part hereof, and in which are shown, by way of illustration, specific embodiments in which the invention may be practiced. It is to be understood that other embodiments may be used, and structural changes may be made without departing from the scope of the present invention.

Figure 1:
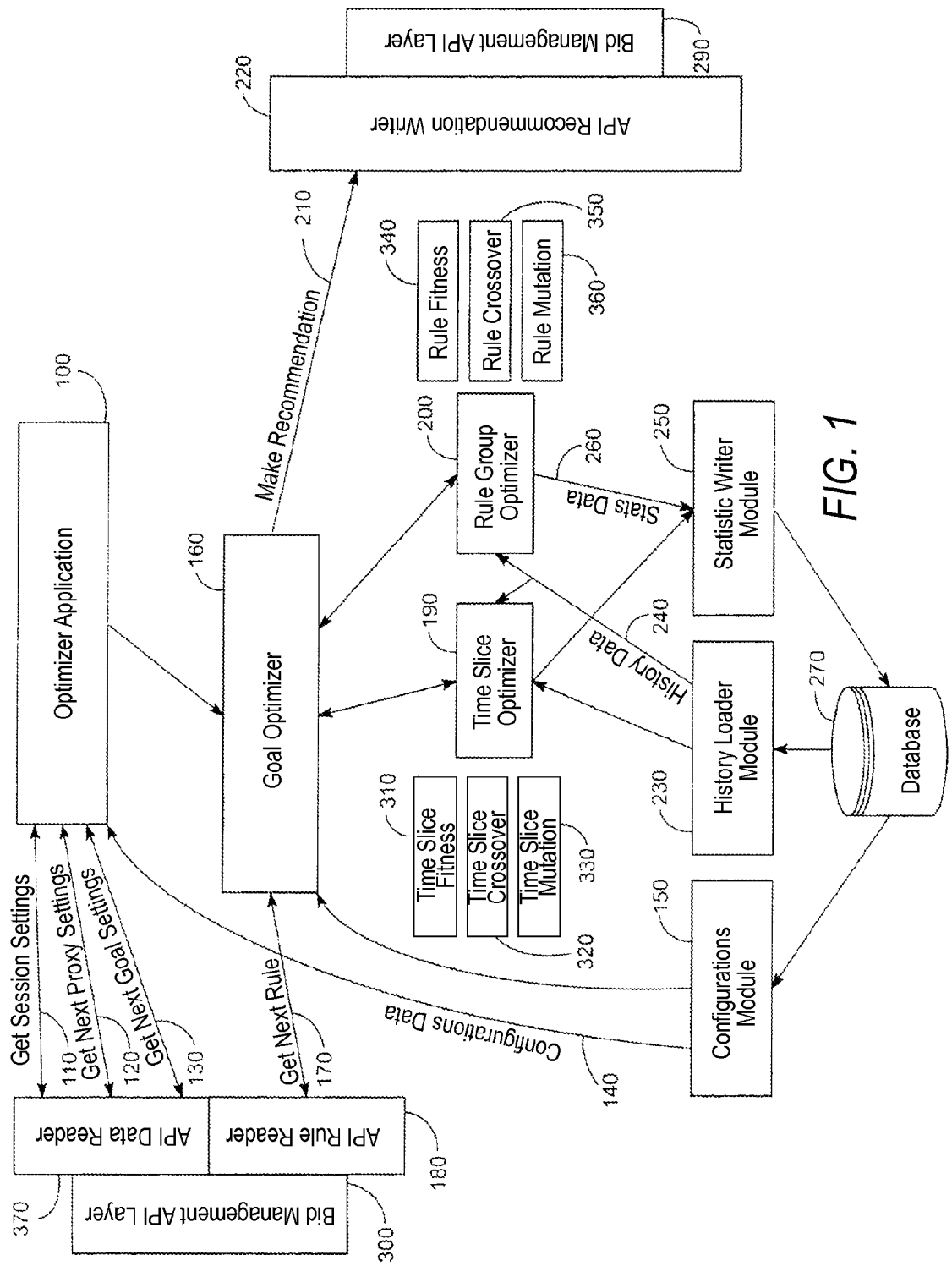
FIG. 1 illustrates the bid management architecture.
Figure 3A:
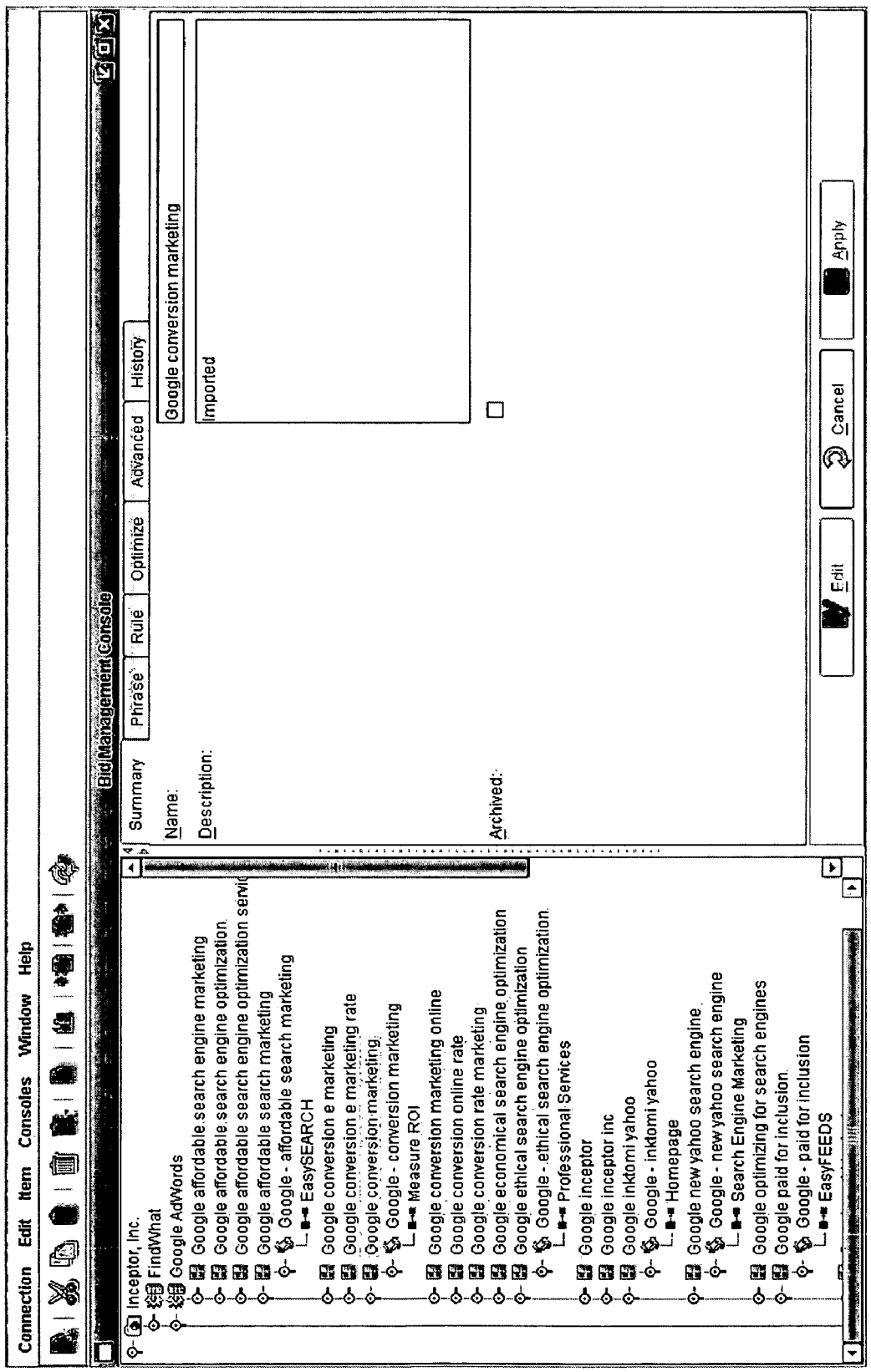
FIG. 3A shows the GUI for the main console, summary tab.
Figure 3B:
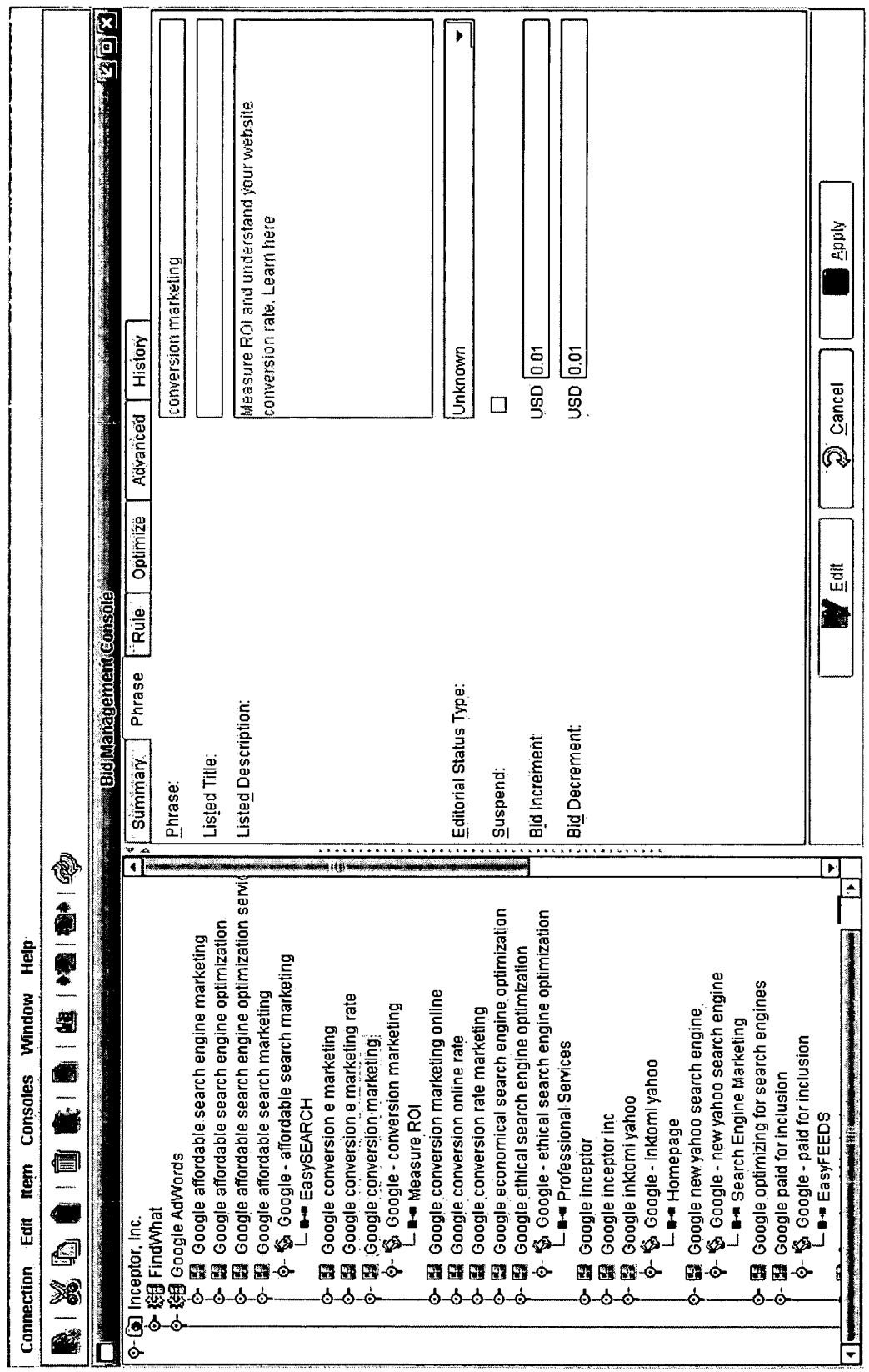
FIG. 3B shows the GUI for the main console, phrase tab.
Figure 3D:
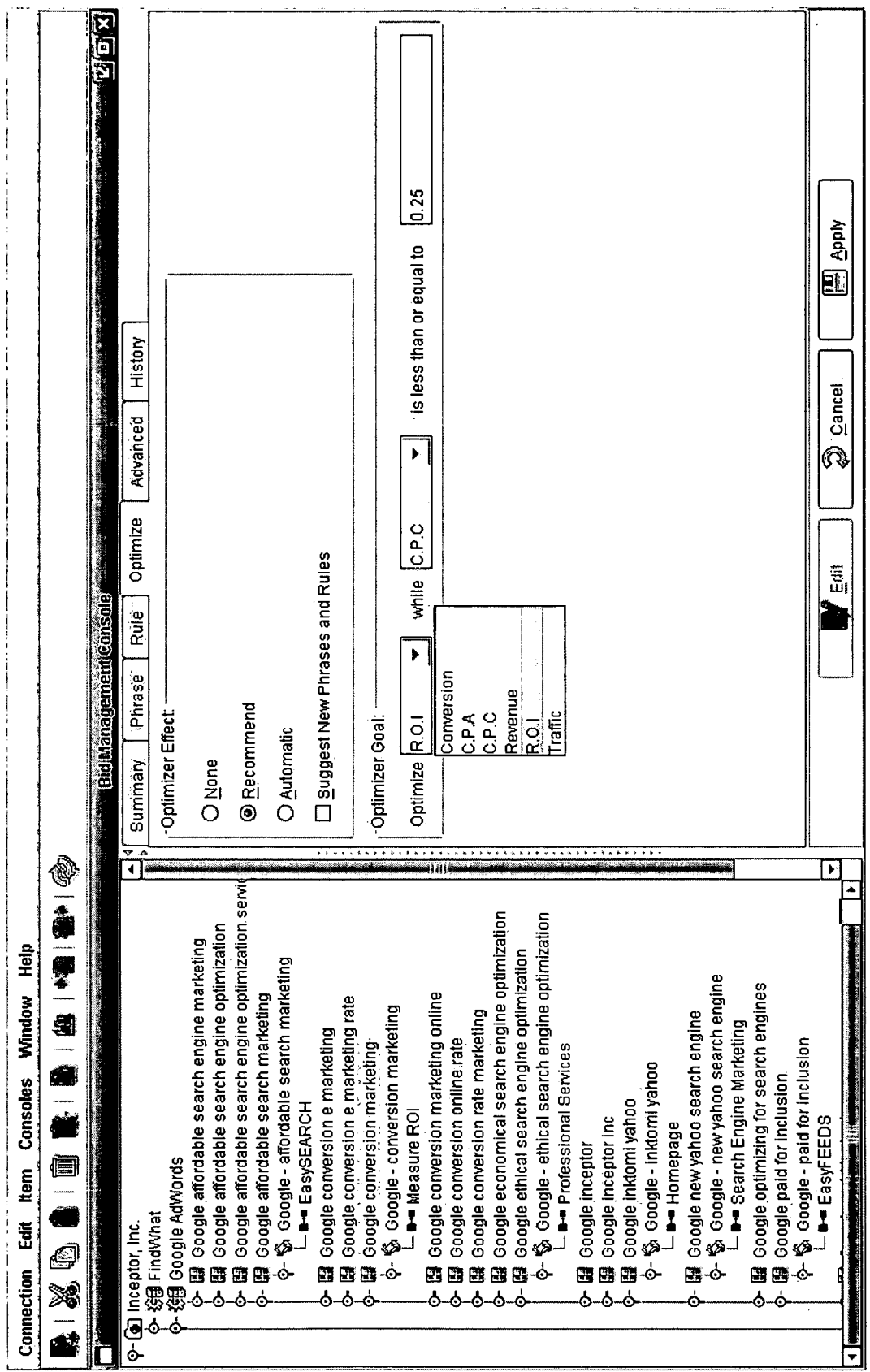
FIG. 3D shows the GUI for the main console, optimizer tab.
Figure 3E:
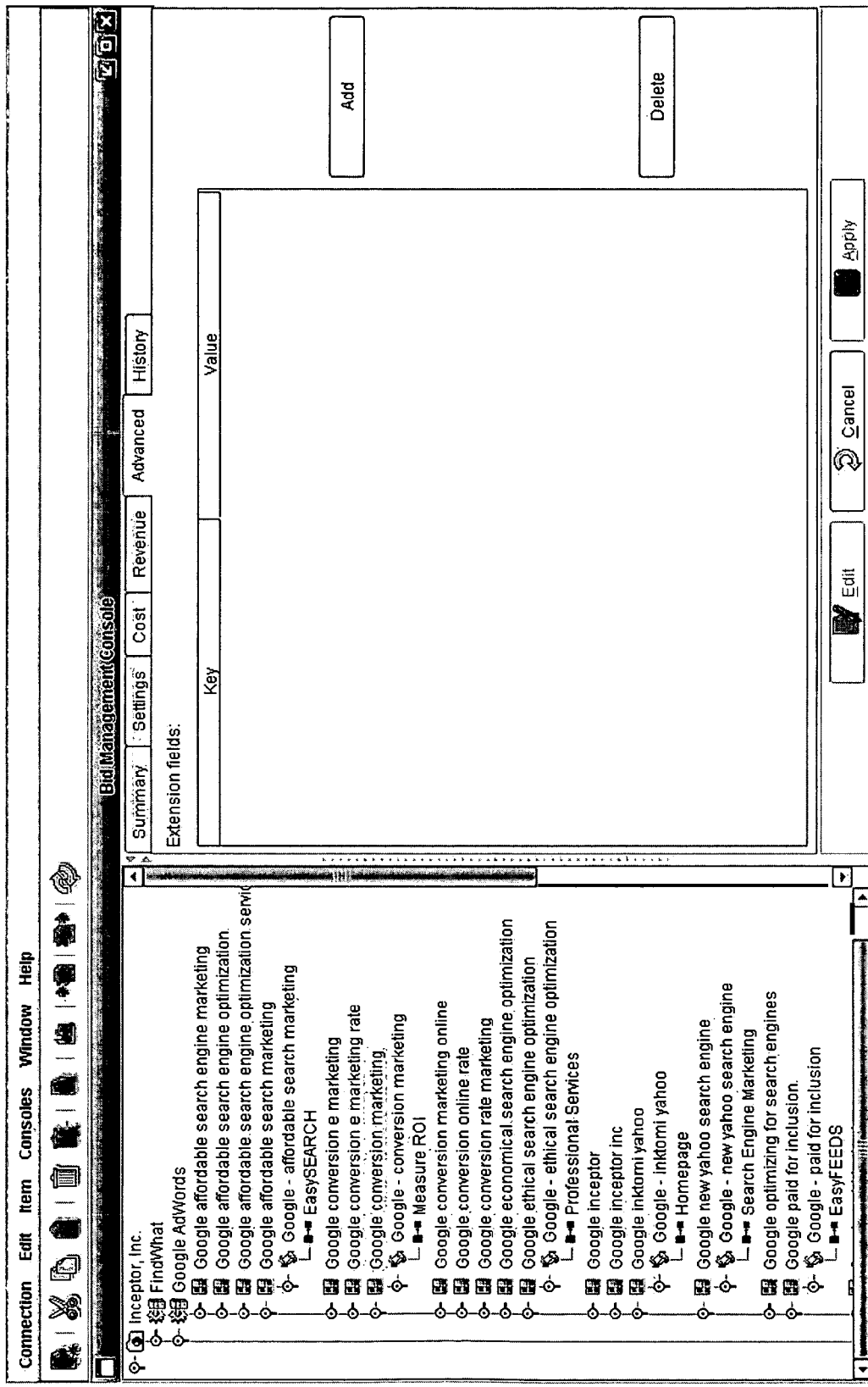
FIG. 3E shows the GUI for the main console, advanced tab.
Figure 3F:
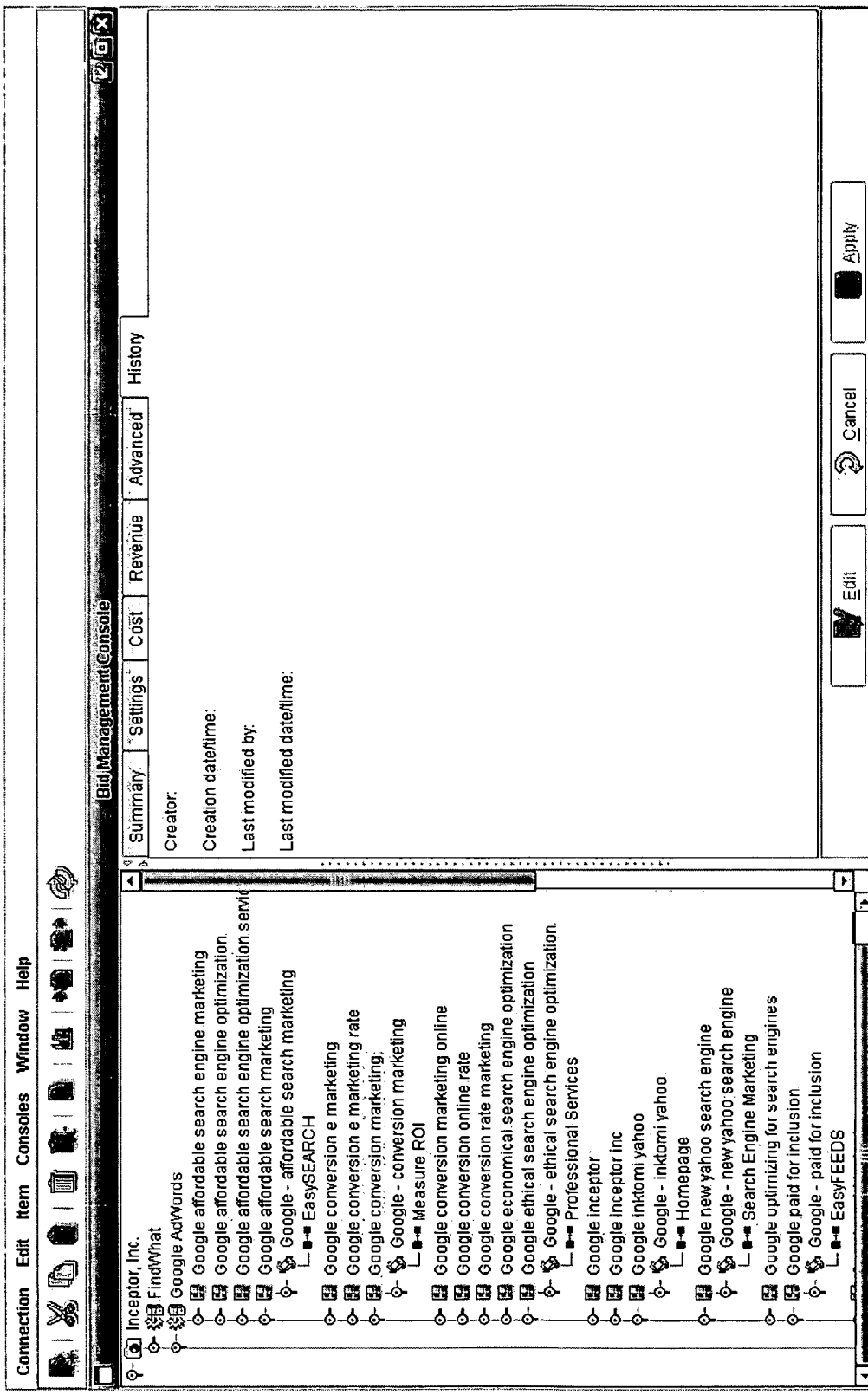
FIG. 3F shows the GUI for the main console, history tab.

Referring now to FIG. 1, the optimizer application 100 receives session settings 110, next proxy settings 120, and next goal settings 130 from the API data reader 370, receives configurations data 140 from the configurations module 150, which reads configurations data 140 from the database 270. The optimizer application 100 then sends the session settings 110, next proxy settings 120, next goal settings 130, and configurations data 140 to the goal optimizer module 160.

The goal optimizer module 160 gets next rule settings 170 from the API rule reader 180, exchanges information with the time slice optimizer module 190 and the rule group optimizer 200, and sends recommendation data 210 to the API recommendation writer 220.

The history loader module 230 reads history data 240 from the database 270 and sends history data 240 to the time slice optimizer module 190 and the rule group optimizer module 200.

The statistics writer module 250 receives statistics data 260 from the time slice optimizer module 190 and the rule group optimizer module 200 and writes the statistics data 260 to the database 270.

Referring now to FIG. 2, where centralized keyword management is illustrated. Keywords are grouped into a tree structure and displayed together in one area while management features are simultaneously displayed in an adjoining area.

Figure 3C:
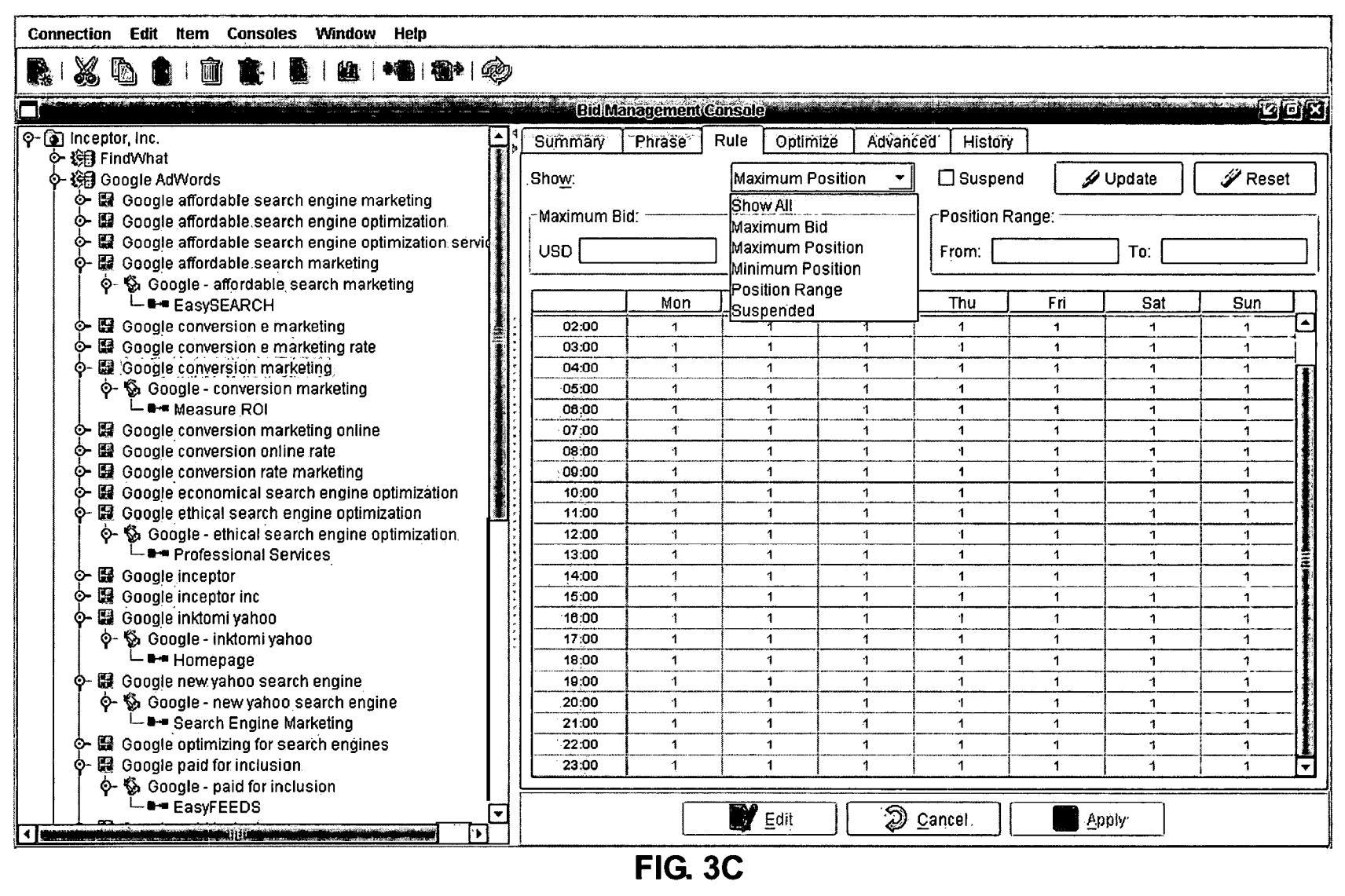

FIGS. 3A-3F show in detail how the management structure and functionality is preferably embodied. Each figure displays different features for management of a particular keyword.

The 3 principle new concepts in the present invention are: PFP engine, rule, and keyword. PFP engines to rules is a 1-to-many relation: one PFP engine can have multiple rules associated with it, but each rule is targeted at exactly one PFP engine. This is so because different engines might allow for varying expressive power in the rules they allow.

Rules to Keyword is a many-to-many relation: one rule governs zero or more keywords, and one keyword participates in bidding through zero or more rules. Both keywords and rules can exist on their own, without being assigned to any entity of the other kind But once created, they can be assigned or reassigned without limit. Both relations, with their given cardinalities, are best expressed in a tree format by allowing for both a rule-centered and a keyword-centered view.

The bid management optimizer application 100 (BMO) works in conjunction with a BM module via the bid management API layer 300 to improve the effectiveness of bidding rules defined within the BM module. The BMO evaluates current and historical performance data associated with rules and generates modifications to existing rules as well as new rules. To accomplish this, BMO communicates with the BM module via some web service (e.g. SOAP), calls to fetch relevant performance data, and passes back recommendations (210). BMO will also record data points in a database 270 for reporting and future optimizations.

The BMO can be scheduled to run periodically such as once per day. The BMO does not need to provide any direct user interface. Instead, all configuration and input parameters may be collected as part of the general BM user interface or configured directly in the database (e.g. configuration parameters that do not need to be directly user-editable). There may be multiple instances of the optimizer running concurrently.

Optimization goals are based on high-level performance metrics collected by the module and passed to the optimizer. Metrics include: ROI (maximize), revenue (maximize), traffic (maximize), conversion rate (maximize), CPA (minimize), cost-per-click (minimize). Each goal is defined by a combination of two metrics. The primary metric is the value to be maximized (or minimized for CPA and CPC). The second metric serves to constrain the optimizer, setting a range of acceptable values. When an improvement to the primary metric would move the secondary metric beyond this range, the optimization would be suppressed.

Example goals for optimization include: maximize conversion rate while keeping ROI between 100% and 400%, maximize traffic while keeping the CPA between $0.50 and $2.50, minimize CPA while keeping ROI between 200% and 300%, maximize ROI while keeping conversion rate>5% (and less than an infinite amount), and maximize revenue while keeping ROI between 100% and 500%. The time interval for revenue and traffic is for a one-week period. For each time slice, the relative fraction is $1/168$th of the total.

Each bid engine/keyword-phrase combination defines a bid rule. Each rule has an associated goal. Time slices, initially day/hour combinations, further define each rule. Each time slice can define the bidding parameters such as enabled/suspended, minimum/maximum bid, minimum/maximum position, and bid increment/decrement. The same phase can appear multiple times on the same bid engine. Nevertheless, each instance will have a unique rule ID.

Based on the historical data associated with a rule or set of rules, the optimizer will recommend changing, per time slice options of: enable/suspend, maximum bid amount, minimum position, maximum position, and bid increment. For each recommendation, the change may come via crossover, mutation, or both, and may appear in the explanation field.

The data collection is organized into a hierarchical structure of 1) projects (clients), 2) goals, 3) bid engines, and 4) rules (keywords/phrases). Optimization of a user's rules may be independent of processing of other users' rules, except for generic, overall market statistics (e.g. bid engine volatility, bid strategies per goal, etc). The three (3) top-levels of the hierarchy can have separate configuration settings that control the performance of the optimizer. The BM API passes this information at the beginning of the loop.

Using the BM API, the Optimizer will fetch data using a series of nested loops. At the completion of data collection for each loop, any optimization will be performed at that level and overall statistics will be generated for further processing in the containing loop.

The performance data is associated with the lowest level of the hierarchy. For each rule, there are 168 possible time slices per week (7×24). The API will use a defined historical window when retrieving the data. For example, if the historical window were 28 days, there would be 672 data points per rule, four for each rule time slice.

Information for each data point includes: rule ID, bid phrase, bid engine, hour of day, day of week, minimum bid, maximum bid, minimum position, maximum position, time wise on/off, suspended, then bid, current bid, listed, average position, average cost-per-click, traffic, revenue, cost, conversion rate, click-through rate, acquisitions, cost-per-acquisition, and return on investment.

A genetic algorithm will be used to find a set of rules that produces the best match for a particular goal. Optimization of the rules is done on a group of rules associated with a common goal. This group of rules defines a population.

In each generation, all the individuals are measured against some fitness criteria. The best group moves onto the next generation unchanged. This is known as elitism. The very worst performing individuals are eliminated from the group. The other low performers are modified somewhat randomly but continue onto the next generation. The middle group is crossed with the elites, taking some of their features, and pass to the next generation. Over time, the more fit individuals will continue from generation to generation and pass their traits to others, improving the set as a whole. Also, if the environment (i.e. bid market) changes, the good rules will tend to lose their place and other rules that adapt to the changing conditions will take their place. Each rule can be optimized by time. In this case, each time slice represents an individual in the population. Each type of optimization will be enabled via a configuration setting.

First, all the rules of a given group will be evaluated to produce a score for how well the rule satisfied the conditions of the goal. The score will be based on the metrics associated with the rule and historical data about the rule. Based on the scores, an ordered list of rules will be generated. The second goal metric is used as a constraint. Individual rules can have values outside of the range.

The list may be divided into three (3) groups: elite, culls, and pool. The elite group is the set of best performing rules. Members of the cull group are the worst performing rules. Pool is the remainder. Optimizer settings control the size of the elite and cull groups.

For optimization, the elite rules are not changed. Rules in the pool are either mutated or crossed with rules in the elite group. Mutation consists of changing the bid parameters in a random way. Random mutations are introduced to adapt to changing market conditions. For each member of the pool group, apply zero or more of the factors from the elite group, randomly selected, to produce a modification.

Any culls that are significantly out of compliance with the goal are suspended. Any culls that are out of compliance are marked as probationary. After a set number of probationary generations, the cull is suspended. The remaining culls are mutated but not crossed with the elites. The user can control how far outside the range any individual rule can vary before the optimizer either suspends the rule or considers the rule on probation. If the group as a whole is out of compliance, the probation period is shortened (i.e. out of compliance culls are suspended more quickly).

Ideally, elites should all be in the second metric range. Any elites that do not fall within the range are treated like pool members (i.e. subject to crossover and mutation). In this case, the crossover will be between two elite members. Suspended rules do not count toward determining if the group is within compliance or not. A rule is suspended when it is generating no positive data, but the rule may be reintroduced by the user. Only populations with a minimum number of individuals will be optimized. An optimizer setting controls this threshold.

If suspension of culls reduces the members of a given population below the minimum threshold and there are previously culled items, the previously best performing will be reactivated and placed back into the population. Alternatively, these could be reactivated randomly with a frequency based on their previous historical value.

Time slice optimization works in a similar way. Each time slice of the rule is considered a member of the population. The time slices are ranked by fitness, divided into elite, pool, and culls, and crossed/mutated. Unlike rules, poorly performing culls are not automatically suspended. There is a maintain time slices optimizer setting that controls this. If it is on, culls are not suspended. If it is off, culls that are not performing and that have a cost>$0.00 are suspended.

For each rule, BM passes the value of the goal metric, so ordering a set can be done simply and quickly. Other factors might affect the "quality" of a rule. For example, rules where the cost has shown a strong upward trend might be given a penalty, to avoid continually favoring spending more money. Other factors include volatility, values outside the bounds of the second metric.

The fitness function can also take into account the relative weight of this rule within its group. For example, a rule that is consuming an inordinate amount of the budget would be penalized. A rule that is not generating any clicks should not be penalized (severely at least), unless there is impression (click-through rate) data. In this case, the rule presents some risk but has not shown to be useful in generating any positive metrics (all metrics should be zero). The historical fitness rate of a new rule having no previous optimizer history is assumed to be zero. Each metric pair can have a unique fitness function. The default fitness function will be a simple measure of the primary and secondary metrics. Architecture will accommodate incrementally adding/changing scoring factors.

Time slice encoding encodes a time slice member of the population. For example, a time slice may be encoded with elements: suspended, maximum bid, minimum position, position spread, bid increment, bid decrement, and current bid. The maximum bid position information is converted to the difference between minimum position and maximum position. For example, if minimum position=5 and maximum position=3, the position spread value would be 2. This makes it easier to avoid inconsistent values with crossover and mutation.

The last three (3) are only useful for bid engines that do not supply current market conditions. Otherwise, the BM will always adjust the current bid to the amount necessary to achieve the desired position. For bid engines that do not supply market conditions, they have some use as the optimizer would give values that moved more quickly toward the correct amount (fewer time slices necessary to get desired results).

For rule encoding, each rule will consist of a series of bid parameters arranged according to the time slices that make up that rule. The time slices will be in time sequential order. Architecture will accommodate incrementally modifying encoding schemes. The state of the time slice passed from BM defines the gene values. Crossover and mutation will change these genes over time. The user can also edit these values manually. When effects of the crossover and mutation are applied to the rule, the optimizer will validate that the resulting values are within reasonable bounds (e.g. minimum position is less than maximum position, maximum bid is greater than or equal to minimum bid, etc.).

Crossover takes some of the values from one of the elite rules and transfers it to one of the individuals in the pool set, resulting in a new version of the pool individual. The elite is unchanged. For time slice encoding, the optimizer will use uniform crossover. In uniform crossover, each individual value as some probability, as each value is relatively independent.

For rule encoding the optimizer uses 2-point crossover. In this case, a random segment from the pool individual will be transferred to the new individual. Due to the more linear nature of the rule encoding (each time slice is positioned relative to the time sequence), the optimizer transfers groups that are contiguous. Crossover will not result in rule deactivation because an elite must be active. Architecture will accommodate incrementally modifying crossover functions.

Mutation works by randomly selecting some of the encoded values and changing them, in either direction, by a small amount. The mutation rate is typically very low and controlled by an optimizer setting. The mutation rate may decline with the number of generations a rule has been optimized, or the amount of improvement in the previous generation. This allows for more variation or experimentation early on that settles down as an optimal point is neared. Elite and cull rates may be adjusted in a similar fashion. Mutation rates for each element of the encoding for time slices may be based on historical value for mutations of that element. Architecture will accommodate incrementally modifying mutation functions.

Optimization normally stops when the average fitness for the rules in the population is not increasing by more than the minimum improvement rate. Optimization may resume if the fitness rate falls for more than two generations after optimization was suspended.

To reduce the risk of bidding on a keyword getting too expensive, the optimizer makes adjustments. Rules that have high costs (more than one standard deviation) will be penalized. Rules that are the best performing will not be changed (elitism). A minimum number of rules will be maintained within the rule population, regardless of rule performance. Rules that violate costs may be penalized. Rules that have steadily increasing costs may be penalized.

Each goal/bid engine combination follows an optimization process. The optimizer gathers all data points from the BM using the API. For a rule, it loads historical data about this rule and preprocesses any synthetic data, then initializes data for new rules. If enabled, it optimizes time slices: calculate time slice fitness, order slices, copy elites, cross and mutate pool, and mutate culls. Cross-set statistics are generated such as average cost. For each set, it calculates the fitness of the set using the data points, the historical data, and any synthetic and cross-set calculations. Based on the fitness calculation, it orders the set. Each member of the elite group is copied into the new generation. For each member of the pool group, it grabs a random parent from the elite group and generates a new rule via crossover (see above). Then it mutates the new member and adds to the new generation. For each member of the culls group, it copies the member, mutates it, and adds it to the new generation. Information about the intergenerational transformations is stored in the database. For each member of the pool and cull groups, it generates a recommendation and passes the recommendation to the API; then is clean-up.

The behavior of the optimizer will be controlled by a number of settings. This will allow for fine control over the degree of optimization, as well as the performance and resource demands of the system. Each setting may display legal and default values along with the level in the object hierarchy with which the setting is associated.

There are multiple optimization settings:
1) Optimize time slices—performs optimization at the time slice level.
2) Optimize rules—performs optimization at the rule level (across all slices, aggregate).
3) Elite rate—percentage of the best time slices/rules that are passed unchanged, to the next generation.
4) Cull rate—percentage of the worst time slices/rules that are treated as culls (no crossover, change only via mutation).
5) Cull suspend rate—probability that a cull will be suspended in each generation.
6) History window—number of days of historical information retrieved for each rule.
7) Generations—number of generations of historical data to load.
8) Minimum data points—minimum number of data points for a given rule before attempting optimization (rules with less data are ignored).
9) Minimum improvement—minimum percentage improvement in the average fitness score necessary to continue optimization.
10) Over metric deviance—percentage over the maximum boundary of the secondary metric that is permitted before automatic suspension.
11) Under metric deviance—percentage under the minimum boundary of the secondary metric that is permitted before automatic suspension.
12) Probation generations—number of generations a cull can be on probation before suspended.
13) Mutation rate—the likelihood of parameter mutation.
14) Crossover rate—the likelihood of parameter modification via crossover.
15) Minimum population—smallest number of rules in a given group (will not suspend any rules if the population would go below this size).
16) Maximum overbid—the maximum amount that the optimizer will recommend raising the bid amount over the current maximum bid via mutation. If the user has automatic acceptance enabled, this is the maximum amount the optimizer can do in a single pass. Subsequent optimizations, however, may increase the amount again as there is no way to distinguish between an optimizer-set maximum bid and one entered by the user. Setting this value to zero (0) will prevent the optimizer from increasing the maximum bid.
17) Maintain bid position—whether or not to suspend time slices that are not performing within bounds.

Figure 4:
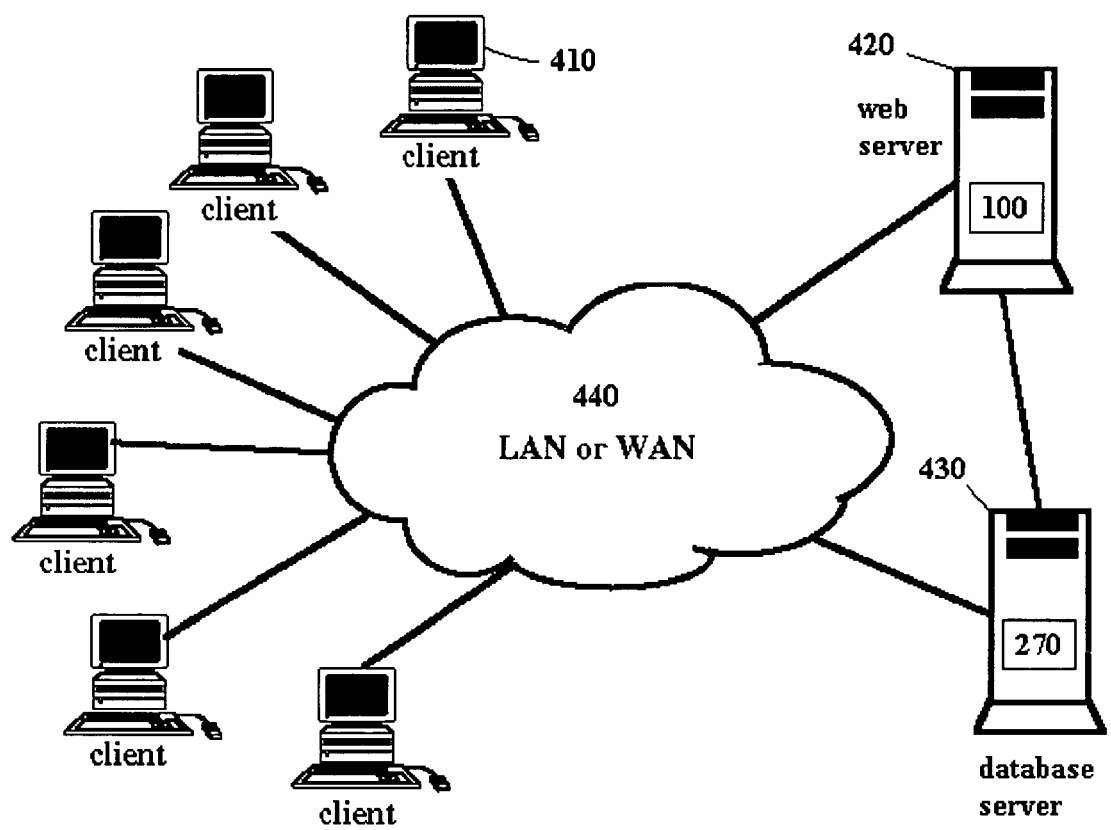
FIG. 4 shows a client-server environment for the invention.

Referring now to FIG. 4, which shows a client-server environment for the invention.

One or more client computers 410 connect via a LAN or WAN 440, such as the Internet, to a web server 420 operative to run the optimizer application 100 and to a database server 430 operative to serve the database 270.

In the preferred embodiment, the optimizer application 100 is written in the Java programming language and runs on a server computer accessible via a web browser from a client computer or device. In the preferred embodiment, the server hardware is an Intel-based PC, the operating system is Linux, the web server software is Apache, and the database 270 is an Oracle database.

Other Embodiments

Another embodiment includes the ability to manage the funding of BM programs.

Another embodiment includes the means to manage the creative marketing elements of a BM program.

Another embodiment includes real time reporting of BM programs delivered by electronic and other means.

As will also be apparent to those skilled in the art, the optimizer application 100 encompasses alternate embodiments of the software program in which the functions of the system are performed by modules different than those shown in the FIGS. The optimizer application 100 may process the data in a serial or parallel fashion, or a combination of the two, without departing from the spirit or scope of the invention. The software program may be written in one of several widely available programming languages, and the modules may be coded as subroutines, subsystems, or objects depending on the language chosen. Similarly, data used by optimizer application 100 is described and represented as logical records embodied in a database but the invention is not limited to the described arrangement of data records, nor is the use of any particular type of data management system implied. Relational database systems from vendors such as Oracle, Sybase, Informix, or Microsoft provide the necessary infrastructure for managing the underlying data in the system, whether it is centralized or distributed, but other organizational data structures, e.g. indexed flat files or XML-based data structures, may be substituted without exceeding the scope of the invention.

The web server 420 and the database server 430 may be implemented on one single physical server, multiple servers, virtual servers, distributed servers, or any combination thereof. The optimizer application 100 may also be implemented as a Java applet in the Java Virtual Machine (JVM) environment on a client computer 420, and client computer 420 may be a computer, PDA, or any hardware or software device operative to communicate with a server.

Furthermore, alternate embodiments of the invention that implement the optimizer application 100 in hardware, firmware, or a combination of both hardware and software, as well as distributing the modules and/or the data in a different fashion will be apparent to those skilled in the art and are also within the scope of the invention.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method, comprising:
   receiving, in a computing device, from a module that manages bids to bid engines, data relating to a bid rule, the data including at least two metrics concerning performance of the bid rule;
   selecting two of the metrics for defining a goal for the bid rule, wherein a first one of the selected metrics is a primary metric and a second one of the metrics is a secondary metric, the primary metric being a value that is subject to an optimization, and the secondary metric being used to establish one or more constraints; and
   defining the goal by performing the optimization subject to the one or more constraints.

2. The method of claim 1, further comprising transmitting the bid rule to the module based at least in part on the goal.

3. The method of claim 1, wherein the bid rule is defined at least in part according to a combination of a bid engine and a keyword phrase.

4. The method of claim 1, wherein the bid rule is defined at least in part according to a time slice.

5. The method of claim 4, wherein the time slice defines at least one bidding parameter, the at least one bidding parameter including at least one of enabled/suspended, minimum/maximum bid, minimum/maximum position, and bid increment/decrement.

6. The method of claim 1, further comprising performing the optimization according to a series of time slices.

7. The method of claim 1, further comprising obtaining the data according to each of a plurality of time slices.

8. The method of claim 1, wherein the optimization is one of a maximization and a minimization.

9. The method of claim 1, wherein the goal includes maximizing a conversion rate while constrained by a return on investment metric.

10. The method of claim 1, wherein the goal includes maximizing traffic while constrained by a cost per acquisition metric.

11. The method of claim 1, wherein the goal includes maximizing return on investment while constrained by a conversion rate metric.

12. The method of claim 1, wherein the goal includes maximizing revenue while constrained by a return on investment metric.

13. A system, comprising:
a computing device configured to:
receive, from a module that manages bids to bid engines, data relating to a bid rule, the data including at least two metrics concerning performance of the bid rule;
select two of the metrics for defining a goal for the bid rule, wherein a first one of the selected metrics is a primary metric and a second one of the metrics is a secondary metric, the primary metric being a value that is subject to an optimization, and the secondary metric being used to establish one or more constraints; and
define the goal by performing the optimization subject to the one or more constraints.

14. The system of claim 13, the computing device further configured to transmit the bid rule to the module based at least in part on the goal.

15. The system of claim 13, wherein the bid rule is defined at least in part according to a combination of a bid engine and a keyword phrase.

16. The system of claim 13, wherein the bid rule is defined at least in part according to a time slice.

17. The system of claim 16, wherein the time slice defines at least one bidding parameter, the at least one bidding parameter including at least one of enabled/suspended, minimum/maximum bid, minimum/maximum position, and bid increment/decrement.

18. The system of claim 13, the computing device further configured to perform the optimization according to a series of time slices.

19. The system of claim 13, the computing device further configured to obtain the data according to each of a plurality of time slices.

20. The system of claim 13, wherein the optimization is one of a maximization and a minimization.

21. A computer-readable medium tangibly embodying computer-executable instructions, the instructions including instructions for:
receiving, from a module that manages bids to bid engines, data relating to a bid rule, the data including at least two metrics concerning performance of the bid rule;
selecting two of the metrics for defining a goal for the bid rule, wherein a first one of the selected metrics is a primary metric and a second one of the metrics is a secondary metric, the primary metric being a value that is subject to an optimization, and the secondary metric being used to establish one or more constraints; and
defining the goal by performing the optimization subject to the one or more constraints.

22. The instructions of claim 21, further comprising instructions for transmitting the bid rule to the module based at least in part on the goal.

23. The instructions of claim 21, wherein the bid rule is defined at least in part according to a combination of a bid engine and a keyword phrase.

24. The instructions of claim 21, wherein the bid rule is defined at least in part according to a time slice.

25. The instructions of claim 24, wherein the time slice defines at least one bidding parameter, the at least one bidding parameter including at least one of enabled/suspended, minimum/maximum bid, minimum/maximum position, and bid increment/decrement.

26. The instructions of claim 21, further comprising instructions for performing the optimization according to a series of time slices.

27. The instructions of claim 21, further comprising instructions for obtaining the data according to each of a plurality of time slices.

28. The instructions of claim 21, wherein the optimization is one of a maximization and a minimization.

* * * * *